July 12, 1932.    P. S. CARTER    1,866,525
FILTER
Filed April 14, 1928
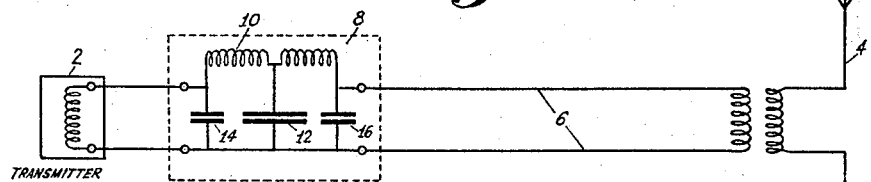
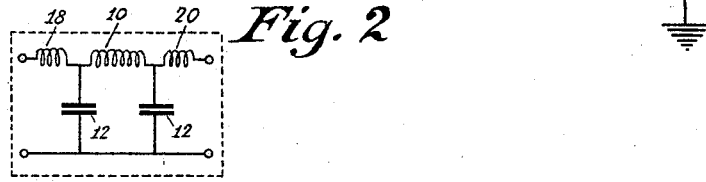
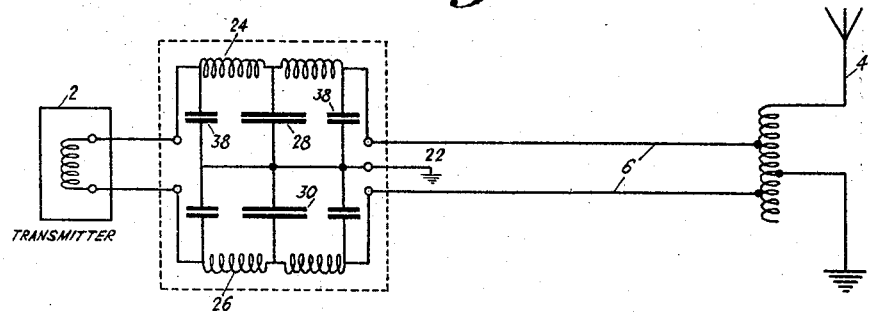
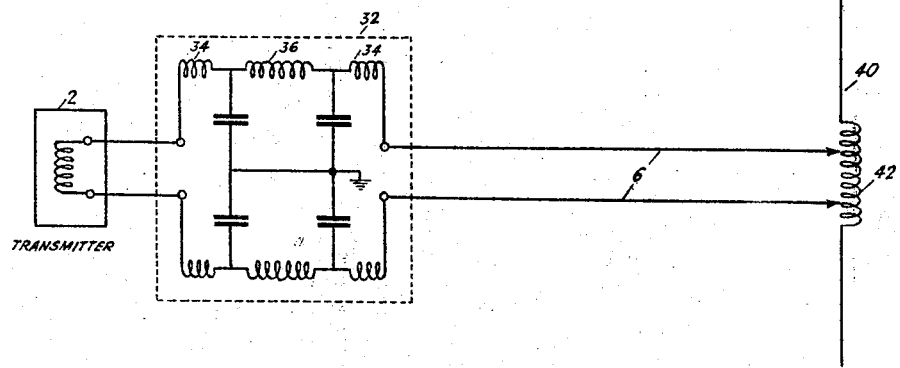
INVENTOR
P. S. CARTER
BY Ira J. Adams
ATTORNEY Patented July 12, 1932

1,866,525

UNITED STATES PATENT OFFICE

PHILIP S. CARTER, OF STONY BROOK, NEW YORK, ASSIGNOR TO RADIO CORPORATION OF AMERICA, A CORPORATION OF DELAWARE

FILTER

Application filed April 14, 1928. Serial No. 269,962.

This invention relates to filters, and more particularly their use to prevent radiation of harmonics from a radio transmitter.

In all transmitters, and especially those of the vacuum tube type, there is usually present a considerable amount of energy having frequencies which are multiples of the fundamental. This energy, if radiated, often causes very serious interference, for a harmonic of a commercial communication frequency may lie, for example, in the broadcast range of frequencies. Accordingly, it is an object of my invention to prevent the radiation of harmonics, which I do by coupling between the transmitter and the antenna, and preferably near the transmitter so that the transmission lines will not carry energy of harmonic frequency, a low pass filter having its cut off frequency above the fundamental and below the first harmonic of the transmission frequency.

It is exceedingly desirable that a transmission line carrying high frequency energy be made reflectionless and equivalent to an infinite line by matching its surge impedance at the terminal of the line. The insertion of a filter provides an interruption in the line which upsets its smooth action as an equivalent infinite line, and to overcome this difficulty is a further object of my invention, which I do by adjusting the values of the inductances and capacitances of the filter so that their product is that needed for the desired selectivity characteristic of the filter, and at the same time their ratio is that needed for the filter to match the surge impedance of the line at the transmission frequency.

Often the transmission line is arranged symmetrically with respect to ground, and in such case a filter of the ordinary type, not being symmetrical with respect to ground, causes the system to be unbalanced. Furthermore, both lines together may act as a line with respect to ground, so that it is necessary to provide filter between the lines and ground, as well as between the lines. To satisfy these requirements is a further object of my invention, which I do by providing two filters having series reactances which are halved, and shunt reactances which are doubled, relative to a single filter, and connecting one side of each of the filters together and to ground, and connecting the other side of each of the filters in a different one of the two transmission lines. While the cut off frequency of the resulting filters is unchanged the surge impedance between each line and ground is matched by the impedance of the corresponding filter.

The invention is more fully described in the following specification, which is accompanied by a drawing in which Figure 1 shows the use of a simple filter having end condensers;

Figure 2 is a modification of the filter portion of Figure 1 and shows the use of end inductances;

Figure 3 is a wiring diagram for a filter balanced with respect to ground; and

Figure 4 is a modification of Figure 3 showing the use of end inductances and a symmetrical antenna system.

Referring to Figure 1 it will be seen that there is a transmitter 2, which feeds a suitable radiating system 4, through a transmission line 6. To prevent the radiation of harmonics a filter 8 is inserted in the transmission line.

This filter employs series inductances and shunt capacitances, and therefore is a low pass filter. Each section consists of an inductance 10 and a condenser 12, and for a desired cut off frequency $f_{co}$, which, as before stated, is to be chosen between the fundamental and the first harmonic, the product of the values of inductance and capacitance may be determined by the formula $$f_{co} = \frac{1}{\pi\sqrt{LC}}.$$

Now in accordance with the present invention, in order that the filter may have an impedance equal to the surge impedance of the line, the values of inductance and capacitance are so chosen, from among the numerous sets of values which give the correct product, that the correct impedance will be obtained, as determined by the formula $$\frac{\sqrt{\frac{L}{C}}}{\sqrt{1-\left(\frac{f}{f_{co}}\right)^2}},$$

in which $f$ is the transmission frequency and $f_{co}$ is the desired cut off frequency. It is clear that for the transmission frequency, a cut off frequency, and a line surge impedance which are all determined, this equation is in terms of the ratio $$\frac{L}{C},$$

and therefore the two given equations may be solved simultaneously for the correct values of L and C which fulfill both conditions.

The filter may be built with as many sections as may be desired, but has been shown in the present instance as having only two sections, which ordinarily is sufficient for the present purpose. It is to be noted that the filter is made symmetrical at its ends, which is simply done by providing at each end condensers 14 and 16 of half the capacitance of the condenser 12.

Figure 2 shows an alternative filter arrangement in which one of the inductances is divided into two portions 18 and 20, each having one half the reactance of the inductance 10. In this case the formula for the impedance is $$f=\sqrt{\frac{L}{C}}\sqrt{1-\left(\frac{f}{f_{co}}\right)^2}$$

In the arrangement shown in both Figures 1 and 2 the filter is not balanced, and is only suitable in cases where the line also is not to be kept balanced, as if one side is grounded. It is frequently desirable to keep the transmission line balanced with respect to ground as a neutral, as in the modification shown in Figure 3, in which case a filter such as has been shown in Figures 1 and 2 will offset the symmetry of the arrangement. Furthermore, both lines may carry energy in parallel, relative to ground, and this energy transfer will not be filtered, and will cause radiation of harmonics. I overcome these difficulties by providing two filters, adjacent sides of which are connected together and to ground by a conductor 22, as shown, and the other sides of which are connected in the transmission lines.

In each filter section between the lines we may regard the inductances 24 and 26 as being in series, and therefore they should each have half the inductance before computed for a single filter, whereas the condensers 28 and 30, which are in series, should each have double the capacitance computed for a single filter, in order that the product and ratio of overall inductance and capacitance may remain the same as before.

This change in magnitude may be explained from a slightly different aspect. The surge impedance of each of the lines of the transmission line with respect to ground is half of the surge impedance of the line, and considering each half of the symmetrical filter as a single filter it should match the impedance between its line and ground. A moment's reflection will show, from a consideration of the formulæ previously given, that this change will require the radical $$\sqrt{\frac{L}{C}}$$

in the impedance equation to have half value, which may be obtained by halving L and doubling C, without, meanwhile, changing the product of L and C in the equation expressing the desired cut off frequency of the filter. Then each filter, connected between one line and ground, matches the surge impedance of the line to ground, and since each filter has half the surge impedance of the line, the two filters, connected as shown in Figure 3, match the entire surge impedance of the line.

Meanwhile each half of the filter is itself a filter of the same cut or frequency, and is connected between each line and ground, and therefore filters whatever energy the lines may carry in parallel relative to ground as a return.

Figure 4 is somewhat like Figure 3 but the symmetrical filter 32 is provided with end inductances 34, of half the magnitude of the inductance 36, instead of having end condensers 38, of half the magnitude of the condenser 28, as was the case in the filter shown in Figure 3.

The antenna 40, in Figure 4, is a simple linear oscillator, or dipole radiator, which is not grounded. The impedance of the transmission line 6 is matched by adjustment of the coupling to the transformer coil 42. With this type of radiating system a completely balanced and symmetrical transmission system is essential, and is provided for by my invention.

It should be appreciated that for some conditions it may be preferable to use a filter of special characteristics, rather than a simple low pass filter. It should also be recognized that it is possible to provide filters of unequal impedance in case the surge impedance between one line and ground differs from that between the other line and ground, tho such a requirement is against the trend of modern practice.

I claim:

1. A transmission system comprising a transmitter, an antenna, a line coupling the transmitter to the antenna, and a low pass filter having series inductances and shunt capacitances arranged for a cut off frequency above the fundamental and below the first harmonic of the transmission frequency, and having a characteristic impedance equal to the surge impendance of the line, connected in the line.

2. A transmission system comprising a transmitter, an antenna, a two wire line coupling the transmitter to the antenna, two low pass filters, means connecting one side of each of said filters to ground, and means connecting the other side of each of said filters in a different one of the lines of the transmission line, each filter having series inductances and shunt capacitances the product of the values of which is such that the cut off frequency is above the fundamental and below the first harmonic of the transmission frequency, and at the same time the ratio of which is such that the impedance of each filter matches that of the corresponding line to ground.

3. A symmetrical transmission system comprising a transmitter, an antenna balanced with respect to ground, a two wire line balanced with respect to ground for coupling the transmitter to the antenna, two low pass filters, means connecting one side of each of said filters to ground, and means connecting the other side of each of said filters in a different one of the lines of the transmission line, each filter having series inductances and shunt capacitances the product of the values of which is such that the cut off frequency is above the fundamental and below the first harmonic of the transmission frequency, and at the same time the ratio of which is such that the impedance of each filter matches that of the corresponding line to ground.

4. A transmission system comprising a transmitter, an antenna, a two wire line coupling the transmitter to the antenna, two low pass filters, means connecting one side of each of said filters to ground, and means connecting the other side of each of said filters in a different one of the lines of the transmission line, each filter having series and shunt reactances the product of the values of which is such that the cut off frequency is above the fundamental and below the first harmonic of the transmission frequency, and at the same time the ratio of which is such that the impedance of each filter matches that of the corresponding line to ground.

5. A symmetrical transmission system comprising a transmitter, an antenna balanced with respect to ground, a two wire line balanced with respect to ground for coupling the transmitter to the antenna, two low pass filters, means connecting one side of each of said filters to ground, and means connecting the other side of each of said filters in a different one of the lines of the transmission line, each filter having series and shunt reactances the product of the values of which is such that the cut off frequency is above the fundamental and below the first harmonic of the transmission frequency, and at the same time the ratio of which is such that the impedance of each filter matches that of the corresponding line to ground.

PHILIP S. CARTER.